United States Patent
Rusakov et al.

(10) Patent No.: US 9,195,832 B1
(45) Date of Patent: Nov. 24, 2015

(54) SYSTEM AND METHOD FOR PROVIDING ACCESS TO ORIGINAL ROUTINES OF BOOT DRIVERS

(71) Applicant: Kaspersky Lab ZAO, Moscow (RU)

(72) Inventors: Vyacheslav E. Rusakov, Moscow (RU); Andrey L. Kirzhemanov, Moscow (RU); Yury G. Parshin, Moscow (RU)

(73) Assignee: Kaspersky Lab AO

( * ) Notice: Subject to any disclaimer, the term of this patent is extended or adjusted under 35 U.S.C. 154(b) by 0 days.

(21) Appl. No.: 14/607,284

(22) Filed: Jan. 28, 2015

(30) Foreign Application Priority Data

Dec. 5, 2014 (RU) .................................. 2014148959

(51) Int. Cl.
  *G06F 21/57* (2013.01)
  *G06F 21/56* (2013.01)
(52) U.S. Cl.
  CPC ............ *G06F 21/575* (2013.01); *G06F 21/561* (2013.01); *G06F 21/568* (2013.01)
(58) Field of Classification Search
  CPC .................................................... G06F 21/575
  See application file for complete search history.

(56) References Cited

U.S. PATENT DOCUMENTS

| | | | | |
|---|---|---|---|---|
| 5,974,549 | A * | 10/1999 | Golan | 726/23 |
| 7,571,448 | B1 * | 8/2009 | Sallam | 719/331 |
| 7,591,019 | B1 * | 9/2009 | Sobko et al. | 726/24 |
| 8,010,799 | B2 | 8/2011 | Zimmer et al. | |
| 8,171,272 | B1 * | 5/2012 | Chester et al. | 713/1 |
| 8,479,292 | B1 | 7/2013 | Linhardt | |
| 2005/0238005 | A1 * | 10/2005 | Chen et al. | 370/389 |
| 2007/0209032 | A1 | 9/2007 | Mihai et al. | |
| 2008/0005797 | A1 * | 1/2008 | Field et al. | 726/24 |
| 2008/0046709 | A1 * | 2/2008 | Wang | 713/2 |
| 2012/0204193 | A1 | 8/2012 | Nethercutt | |
| 2013/0227680 | A1 * | 8/2013 | Pavlyushchik | 726/21 |
| 2013/0238884 | A1 * | 9/2013 | Musha et al. | 713/2 |

FOREIGN PATENT DOCUMENTS

| | | | |
|---|---|---|---|
| WO | 0574032 | A1 | 12/1993 |
| WO | 0167252 | A1 | 9/2001 |

OTHER PUBLICATIONS

Chris Ries "Inside Windows Rootkits", May 22, 2006; XP-002426314.

* cited by examiner

*Primary Examiner* — Andrew Goldberg
(74) *Attorney, Agent, or Firm* — Arent Fox LLP; Michael Fainberg

(57) ABSTRACT

Disclosed are systems and methods for detecting access of boot driver routines by malware. An example method includes identifying, by the driver interceptor, the one or more boot drivers that have been loaded into memory but not yet initialized; installing, by the driver interceptor, an interceptor handler operable to intercept calls of initialization routines of the one or more identified boot drivers; intercepting, by the driver interceptor, program calls to the initialization routines of the one or more identified boot drivers; storing, by intercept handler, information about the boot driver that is provided by the driver in the course of its initialization, wherein information contains at least address of the entry point for one or more routines of the boot driver; and providing access, by driver interceptor, to the routines of the boot driver by previously stored addresses of the entry points.

18 Claims, 3 Drawing Sheets

SYSTEM AND METHOD FOR PROVIDING ACCESS TO ORIGINAL ROUTINES OF BOOT DRIVERS

CROSS-REFERENCE TO RELATED APPLICATIONS

This application claims benefit of priority under 35 U.S.C. 119(a)-(d) to a Russian Application No. 2014148959 filed on Dec. 5, 2014, which is incorporated by reference herein.

FIELD OF TECHNOLOGY

The present disclosure relates to the field of computer security, and more specifically, to systems and methods for providing access to original routines of boot drivers.

BACKGROUND

A rootkit is a type of malware that frequently used by a third party (usually an intruder) to gain access to a computer system intended to conceal running processes, files or system data, which helps an intruder maintain access to a system without the user's knowledge. A rootkit typically hides logins, processes, threads, registry keys, files, and logs and may include software to intercept data from terminals, network connections, and the keyboard. Rootkits are capable of infecting boot drivers that executed during loading of an operating system (OS) and thus before any antivirus software is loaded on the system. Rootkits may also be embedded in operating system processes in a filter-like manner, so that any regular malware detection means cannot get information related to hidden software or software pieces.

One of the difficulties with detecting rootkits is due to the fact that, unlike viruses, rootkits typically activate themselves before the operating system has completely booted up upon startup of the computer, and rootkits usually acquire system privileges. Also, rootkits typically take steps to mask their existence, and prevent conventional antivirus detection mechanisms from identifying their existence. For example, a typical antivirus software invokes a system function call to identify the processes that are currently running. The rootkit intercepts the function call, and provides its own return parameters to the antivirus software, but masks its own process. Also, the rootkit typically hides the files in which it is stored from conventional antivirus mechanisms that check whether files contain known virus signatures.

Therefore, there is a need to improve detection of rootkits and similar types of malware.

SUMMARY

Disclosed are example aspects of system, methods and computer program products for providing access to original routines of boot drivers. In one example embodiment, a method for detecting access of boot driver routines, the method comprising: identifying, by the driver interceptor, the one or more boot drivers that have been loaded into memory but not yet initialized; installing, by the driver interceptor, an interceptor handler operable to intercept calls of initialization routines of the one or more identified boot drivers; intercepting, by the driver interceptor, program calls to the initialization routines of the one or more identified boot drivers; storing, by intercept handler, information about the boot driver that is provided by the driver in the course of its initialization, wherein information contains at least address of the entry point for one or more routines of the boot driver; and providing access, by driver interceptor, to the routines of the boot driver by previously stored addresses of the entry points.

In one example aspect, the intercept handler is operable to replaces an address of an original entry point of the boot driver, whose pointer is contained in a list of boot drivers, with an address of an entry point of the intercept handler, wherein the original entry point of the boot driver is stored in the intercept handler.

In one example aspect, identification of boot drivers is performed using a list of boot drivers that have been loaded into the memory but not yet initialized.

In one example aspect, the list of boot drivers is read by driver interceptor in system registry.

In one example aspect, the list of boot drivers is read by driver interceptor using OS boot loader.

In one example aspect, the information about the boot driver is saved in a memory region allocated for the driver interceptor.

In one example aspect, the information about the boot driver obtained during initialization of the boot driver contain one or more of: the name of the boot driver; the address of the entry points of some or all of the routines of the boot driver; the parameters transferred to the boot driver by the OS boot loader in the initialization process; the path to the driver in the registry; the address of the entry point; and the driver object structure.

In another example aspect, a computer system for detecting access of boot driver routines, the system comprising: a memory for storing an antivirus application configured to place a driver interceptor into a master boot record of the computer before one or more other boot drivers; a hardware processor coupled to the memory and configured to: identify, by the driver interceptor, the one or more boot drivers that have been loaded into memory but not yet initialized; install, by the driver interceptor, an interceptor handler operable to intercept calls of initialization routines of the one or more identified boot drivers; intercept, by the driver interceptor, program calls to the initialization routines of the one or more identified boot drivers; store, by intercept handler, information about the boot driver that is provided by the driver in the course of its initialization, wherein information contains at least address of the entry point for one or more routines of the boot driver; and provide access, by driver interceptor, to the routines of the boot driver by previously stored addresses of the entry points.

In another example aspect, A computer program product, stored on a non-transitory computer readable medium, wherein the computer program product includes computer executable instructions for detecting access of boot driver routines, including instructions for: identifying, by the driver interceptor, the one or more boot drivers that have been loaded into memory but not yet initialized; installing, by the driver interceptor, an interceptor handler operable to intercept calls of initialization routines of the one or more identified boot drivers; intercepting, by the driver interceptor, program calls to the initialization routines of the one or more identified boot drivers; storing, by intercept handler, information about the boot driver that is provided by the driver in the course of its initialization, wherein information contains at least address of the entry point for one or more routines of the boot driver; and providing access, by driver interceptor, to the routines of the boot driver by previously stored addresses of the entry points.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for detecting access of boot driver routines by malware. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
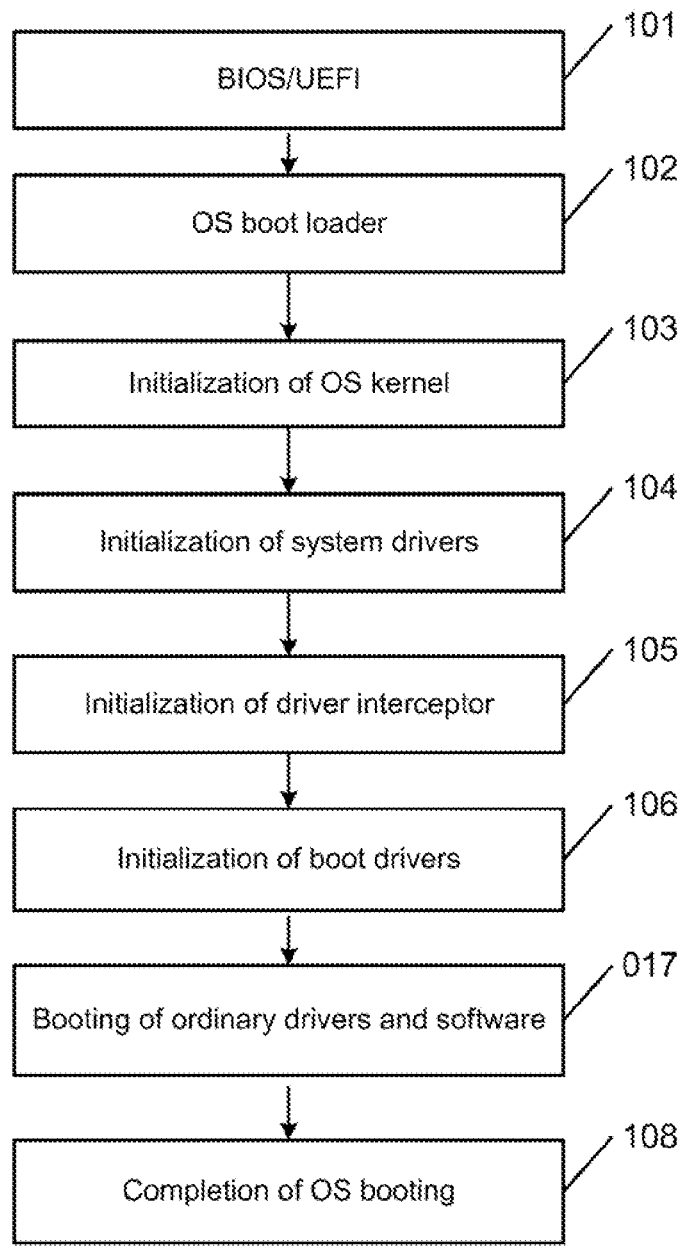
FIG. 1 shows an example of a process of booting an operating system according to one example aspect.

FIG. 1 shows the process of booting an operating system (OS), including the phase of initialization of the driver interceptor in accordance with one aspect of the invention. Such a process of booting the OS is characteristic of the majority of OSs, such as Windows, Unix, OS X, Android and others. When the power supply of the computer is turned on, the BIOS (basic input/output system) is loaded in step 101, and with the help of the software and hardware written into the BIOS the computer equipment is initialized and the POST (power-on self-test) is run. The self-test process terminates when the BIOS finds the system partition of the hard disk, reads the MBR (master boot record) and starts the boot manager (for example, in the Windows OS, Bootmgr.exe). The boot manager finds the OS boot loader in the system partition of the hard disk (such as Winload.exe in the Windows OS) and starts it in step 102. It should be noted that in many modern computers the BIOS has been replaced by the UEFI (Unified Extensible Firmware Interface), and the MBR by the GPT (GUID Partition Table—a format standard for layout of partition table on a physical hard disk using globally unique identifiers (GUID)), respectively, which can be used in the present invention.

In step 103, the OS boot loader initializes the boot-start system drivers needed to read data from the disk and initialize the OS kernel. In step 104, the OS boot loader loads the system registry hive and the system drivers needed to initialize the OS, after which it sends the data which has been read to the OS kernel. In step 105, the driver interceptor installed by the antivirus application is initialized. In one example aspect, in the Windows OS, loading of the driver interceptor before the other drivers can be assured by installing an early boot group in the registry. For example, in the Windows OS, the value SERVICE_BOOT_START of the StartType entry, read from the INF file of the driver, will be written into the registry. Moreover, the antivirus application can change the list of booting groups.

Next, in step 106, the other boot drivers are initialized and in step 107 the ordinary drivers and the software are initialized. The booting of the OS ends in step 108. In one example, if a rootkit has been installed on the computer, its driver can also be initialized in step 107.

Figure 2:
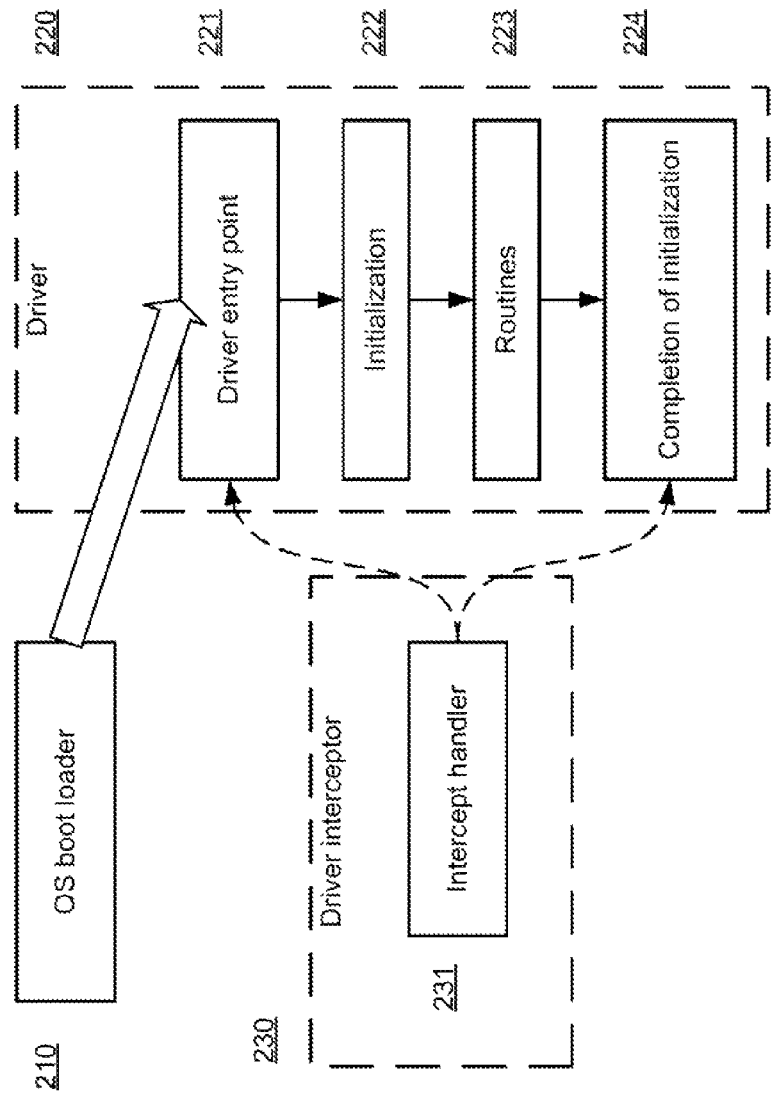
FIG. 2 shows an example method of intercepting the call of the boot driver initialization routine according to one example aspect.

FIG. 2 shows a method of intercepting the call of the boot driver initialization routine. When the boot drivers are initialized in step 106, the OS boot loader 210 transfers control in turn by means of the PnP Manager (Plug and Play Manager—a manager that provides the support for PnP functionality in Windows) to the entry point 221 of each boot driver 220 (hereinafter, for purposes of illustration, this will be called a driver). In one aspect, the OS boot loader 210 transfers to the boot driver 220, as arguments, the pointer to the driver object (a structure containing pointers to the driver routines; for example, in the Windows OS, the structure DRIVER_OBJECT) and the path to the driver key in the registry. As an example, in the Windows OS, the routine DriverEntry is responsible for the initialization 222 of the driver, whose entry point is DriverInit—a member of the structure DRIVER_OBJECT.

In the process of initialization 222 of the boot driver 220, the following actions are performed:

1. The driver stores the entry points for the routines of the driver 223 in the driver object or driver extension. Driver routines include both standard routines (for example, in the Windows OS: AddDevice, StartIo, Unload and others), and the driver's own routines.
2. Various driver-wide objects used by the driver are created and/or initialized, and various system resources of the driver are installed.
3. The unused allocated memory is freed up.
4. The status of completion of the initialization of the driver 224 and the ability to receive and execute requests from the PnP manager for the configuring, adding and running of devices is returned to the OS boot loader.

Since the driver interceptor 230 was initialized as one of the first among the boot drivers in step 105, after initialization it finds and reads the list of boot drivers that have been loaded into memory but not yet initialized. In one aspect, this list can be read in the system registry or with the use of the OS boot loader 210 (for example, in the Windows OS, the list may be kept in the structure KeLoaderBlock, formed and transferred to the entry point of the OS kernel by the OS boot loader).

In one aspect, the list of noninitialized boot drivers may contain the following information:
name;
load address of the boot driver in the memory;
path to the driver in the registry;
object of the driver;
address of the entry point.

After obtaining the list of boot drivers, the driver interceptor 230 installs an intercept handler 231, which is needed to intercept the calls of the initialization routines of the boot drivers. In one aspect, when the intercept handler 231 of the initialization routines of the boot drivers is installed, the intercept handler 231 replaces the address of the entry point of the boot driver 220, whose pointer is contained in the list of boot drivers, with the address of the entry point of the intercept handler 231, wherein the original entry point of the driver 221 will be kept by the intercept handler 231. Thus, when the OS boot loader 210 transfers control to the entry point 221, the control will be intercepted by the intercept handler 231. The intercept handler 231 then transfers the control to the previously saved original entry point of the driver 221.

After completing the initialization routine 224 control will be transferred back to the intercept handler 231 which caused the initialization of the driver 220. The Intercept handler 231 saves information about the boot driver 220 that is provided by the driver in the course of its initialization. In one aspect, the information can contain:

the name of the boot driver 220;
the address of the entry points of some or all of the routines of the boot driver 220;
the parameters transferred to the boot driver 220 by the OS boot loader 210 in the initialization process;
the path to the driver in the registry;
the address of the entry point;
the driver object structure.

In yet another aspect, information about the boot driver 220, as well as its original entry point, can be saved in the memory region allocated for the driver interceptor.

After the booting of the OS, in step 108, various applications of user level are able to call up access routines. By accessing the driver routines, access can be gained to the hardware of various devices via the drivers of these devices. To conceal its presence and the presence of other malicious components in the system, a rootkit may intercept the calls by applications for driver routines in the memory with subsequent filtering of the access to the corresponding devices.

To prevent the malicious activity, in the last step of the present invention the driver interceptor 230 accesses the original routines of the boot drivers. In the Windows OS, the SCSI Port Driver is responsible for working with the disk. Access to the driver routines responsible for working with disk requests (such as IRP_MJ_INTERNAL_DEVICE_CONTROL, IRP_MJ_SCSI) will also occur via the original addresses (i.e., not modified by the rootkit) with the aid of the driver interceptor 230. Thus, if a rootkit is present in the system, it will be accessible to the antivirus application, despite attempts to conceal its operation (location of the file on the disk, control flows, and so on). As a consequence, the rootkit will be analyzed and discovered in the course of the normal antivirus check. In one aspect, the antivirus check may include signature analysis, heuristic analysis, emulation, checking by use of a reputation service, and others.

After detection, the antivirus application may perform the removal of the rootkit: the file on the disk, the malicious code loaded into the memory, and other traces of the activity of the rootkit may be deleted. To check whether the removal was successful, the computer may also be restarted. In certain cases, a restarting of the computer is also needed for complete removal of the malicious code loaded into the memory.

In one example aspect, if it is not possible to remove the rootkit or its parts, the antivirus application may formulate a cure script, which will be implemented in an early stage of the OS booting. After this, it is necessary to restart the computer. The cure script may contain, for example, the address of the location of the rootkit files on the disk and a command to remove them. During the booting of the OS the rootkit will be removed by one of the anti-rootkit drivers of the antivirus that is responsible for implementing the cure scripts.

In one aspect, any other antivirus application driver (such as the anti-rootkit driver) can implement the accessing of the original routines of the boot drivers.

Figure 3:
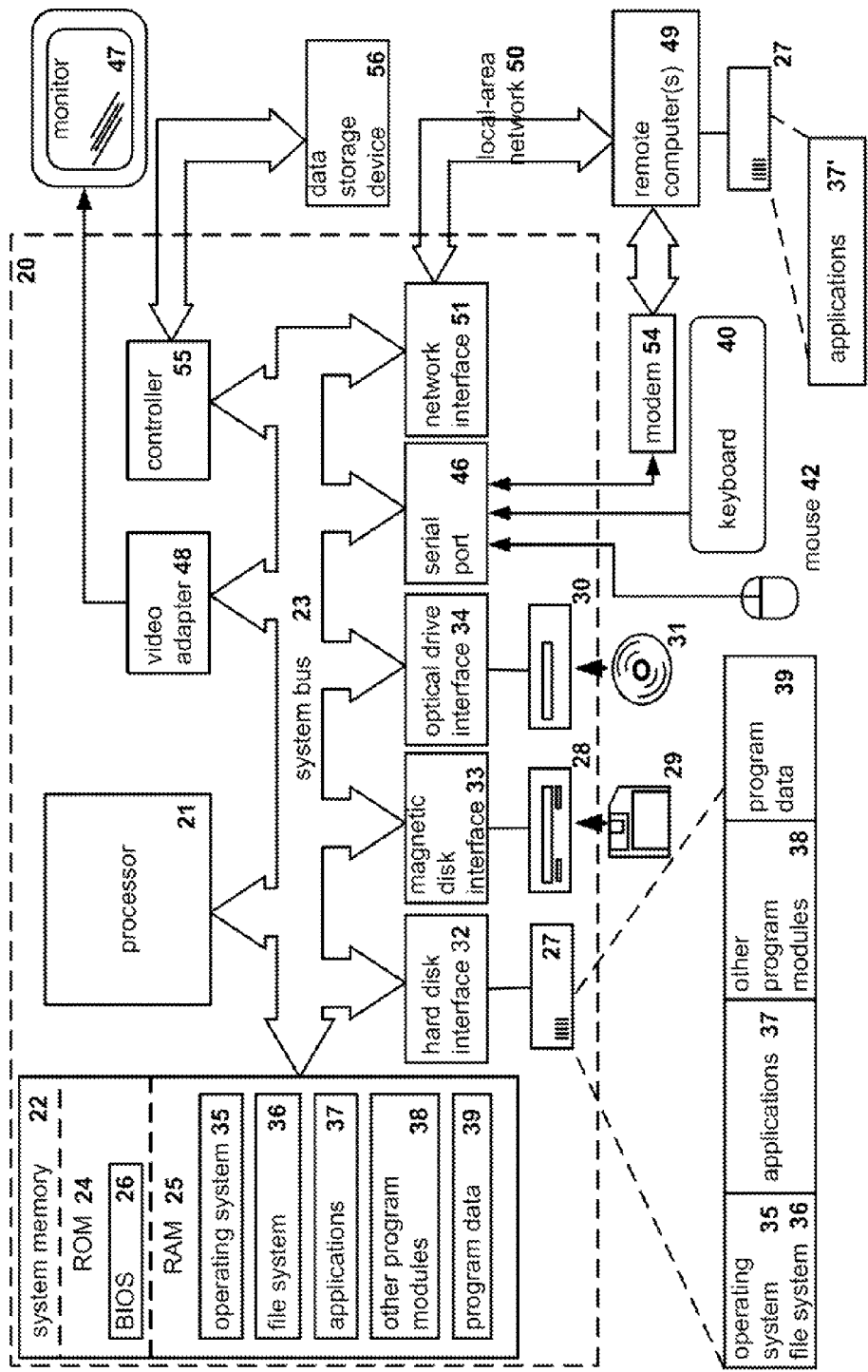
FIG. 3 shows an example of a general-purpose computer system that may be used to implement systems and methods for detecting access of boot driver routines by malware.

FIG. 3 shows an example of a general-purpose computer system (which may be a personal computer or a server) 20, which may be used to implement aspects of system and methods disclosed herein. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to work in a network environment, using a network connection to one or more remote computers 49. The remote computer (or computers) 49 are also personal computers or servers having the majority or all of the aforementioned elements in describing the nature of a personal computer 20, as shown in FIG. 4. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 5 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for accessing routines of boot drivers of an operating system of a computer, the method comprising:
    identifying, by a driver interceptor, one or more boot drivers that have been loaded into memory of the computer, but have not been initialized by a boot loader of the operating system;
    installing, by the driver interceptor, an interceptor handler operable to intercept program calls of initialization routines of the identified one or more boot drivers
    intercepting, by the driver interceptor, the program calls to the initialization routines of the identified one or more boot drivers when the identified one or more boot drivers are initialized by the boot loader of the operating system;
    storing information about the identified one or more boot drivers, wherein the information contains at least an address of an original entry point for the initialization routines of the identified one or more boot drivers;
    replacing, by the interceptor handler, an address of a current entry point of the boot driver for the intercepted program call, whose pointer is contained in a list of boot drivers, with an address of an entry point of the intercept handler, such that control is transferred to the stored original entry point of the boot driver; and
    accessing, by the driver interceptor, the routines of the identified one or more boot drivers using the original entry point.

2. The method of claim 1, wherein identification of boot drivers is performed using a list of boot drivers that have been loaded into the memory of the computer, but have not been initialized by the boot loader of the operating system.

3. The method of claim 2, wherein the list of boot drivers is read by the driver interceptor in system registry.

4. The method of claim 2, wherein the list of boot drivers is read by the driver interceptor using the boot loader of the operating system.

5. The method of claim 4, wherein the information about the boot driver is saved in a memory region of the computer allocated for the driver interceptor.

6. The method of claim 1, wherein the information about the boot driver is obtained during initialization of the boot driver and contains one or more of: the name of the boot driver; the address of the entry points of some or all of the initialization routines of the boot driver; the parameters transferred to the boot driver by the boot loader of the operating system during initialization; the path to the driver in the registry; the address of the entry point; and the driver object structure.

7. A computer system for accessing routines of boot drivers of an operating system, the computer system comprising:
    a memory for storing an antivirus application configured to place a driver interceptor into a master boot record of the computer system before one or more other boot drivers;
    a hardware processor coupled to the memory and configured to:
        identify, by the driver interceptor, one or more boot drivers that have been loaded into the memory, but have not been initialized by a boot loader of the operating system;
        install, by the driver interceptor, an interceptor handler operable to intercept program calls of initialization routines of the identified one or more boot drivers;

intercept, by the driver interceptor, the program calls to the initialization routines of the identified one or more boot drivers when the identified one or more boot drivers are initialized by the boot loader of the operating system;

store information about the identified one or more boot drivers, wherein the information contains at least an address of an original entry point for one or more initialization routines of the identified one or more boot drivers;

replace by the interceptor handler, an address of a current entry point of the boot driver for the intercepted program call, whose pointer is contained in a list of boot drivers, with an address of an entry point of the intercept handler, such that control is transferred to the stored original entry point of the boot driver; and access, by the driver interceptor, the routines of the identified one or more boot drivers using the original entry point.

8. The system of claim 7, wherein identification of boot drivers is performed using a list of boot drivers that have been loaded into the memory of the computer, but have not been initialized by the boot loader of the operating system.

9. The system of claim 8, wherein the list of boot drivers is read by the driver interceptor in system registry.

10. The system of claim 8, wherein the list of boot drivers is read by the driver interceptor using the boot loader of the operating system.

11. The system of claim 10, wherein the information about the boot driver is saved in a memory region of the computer allocated for the driver interceptor.

12. The system of claim 7, wherein the information about the boot driver is obtained during initialization of the boot driver and contains one or more of: the name of the boot driver; the address of the entry points of some or all of the initialization routines of the boot driver; the parameters transferred to the boot driver by the boot loader of the operating system during initialization; the path to the driver in the registry; the address of the entry point; and the driver object structure.

13. A computer program product, stored on a non-transitory computer readable medium, wherein the computer program product includes computer executable instructions for accessing routines of boot drivers of an operating system of a computer, including instructions for:

identifying, by a driver interceptor, one or more boot drivers that have been loaded into memory of the computer, but have not been initialized by a boot loader of the operating system;

installing, by the driver interceptor, an interceptor handler operable to intercept program calls of initialization routines of the identified one or more boot drivers intercepting, by the driver interceptor, the program calls to the initialization routines of the identified one or more boot drivers when the identified one or more boot drivers are initialized by the boot loader of the operating system;

storing information about the identified one or more boot drivers, wherein the information contains at least an address of an original entry point for the initialization routines of the identified one or more boot drivers;

replacing, by the interceptor handler, an address of a current entry point of the boot driver for the intercepted program call, whose pointer is contained in a list of boot drivers, with an address of an entry point of the intercept handler, such that control is transferred to the stored original entry point of the boot driver; and accessing, by the driver interceptor, the routines of the identified one or more boot drivers using the original entry point.

14. The computer program product of claim 13, wherein identification of boot drivers is performed using a list of boot drivers that have been loaded into the memory of the computer, but have not been initialized by the boot loader of the operating system.

15. The computer program product of claim 14, wherein the list of boot drivers is read by the driver interceptor in system registry.

16. The computer program product of claim 14, wherein the list of boot drivers is read by the driver interceptor using the boot loader of the operating system.

17. The computer program product of claim 16, wherein the information about the boot driver is saved in a memory region of the computer allocated for the driver interceptor.

18. The computer program product of claim 13, wherein the information about the boot driver is obtained during initialization of the boot driver and contains one or more of: the name of the boot driver; the address of the entry points of some or all of the initialization routines of the boot driver; the parameters transferred to the boot driver by the boot loader of the operating system during initialization; the path to the driver in the registry; the address of the entry point; and the driver object structure.

* * * * *